United States Patent
Liao et al.

(10) Patent No.: US 8,791,893 B2
(45) Date of Patent: Jul. 29, 2014

(54) OUTPUT COMPENSATION CIRCUIT AND OUTPUT COMPENSATION METHOD FOR LCD DATA DRIVE IC, AND LCD

(75) Inventors: Liang-chan Liao, Shenzhen (CN); Po-shen Lin, Shenzhen (CN); Dongsheng Guo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 367 days.

(21) Appl. No.: 13/380,043

(22) PCT Filed: Nov. 18, 2011

(86) PCT No.: PCT/CN2011/082434
§ 371 (c)(1),
(2), (4) Date: Dec. 22, 2011

(87) PCT Pub. No.: WO2013/071513
PCT Pub. Date: May 23, 2013

(65) Prior Publication Data
US 2013/0120344 A1   May 16, 2013

(51) Int. Cl.
*G09G 3/36* (2006.01)
*G09G 5/00* (2006.01)

(52) U.S. Cl.
CPC ... *G06G 3/36* (2013.01); *G09G 5/00* (2013.01)
USPC .......................................................... 345/98

(58) Field of Classification Search
USPC .................................. 345/98–100
See application file for complete search history.

(56) References Cited

U.S. PATENT DOCUMENTS

| | | | |
|---|---|---|---|
| 2003/0160753 A1* | 8/2003 | McCartney | 345/99 |
| 2007/0080914 A1* | 4/2007 | Sun et al. | 345/88 |
| 2008/0018586 A1* | 1/2008 | Yang et al. | 345/100 |
| 2009/0207192 A1 | 8/2009 | Hashimoto | |

FOREIGN PATENT DOCUMENTS

CN   1949352 A   4/2007

OTHER PUBLICATIONS

2nd Office Action of Chinese Patent Application No. 201110359831.4 issued by Chinese Patent Office.
International Search Report of the PCT Application No. PCT/CN2011/082434.

* cited by examiner

*Primary Examiner* — Liliana Cerullo (57) ABSTRACT

An output compensation circuit and an output compensation method for an LCD data drive IC as well as an LCD comprising the same are disclosed. The output compensation circuit comprises a data drive IC, a plurality of first switch units and a plurality of delay control units. A plurality of output channels of the data drive IC each are connected with a corresponding row of pixel electrodes on a glass substrate via a data line respectively to output a charging signal. Each of the first switch units control the corresponding output channel according to a delay control signal generated by the corresponding delay control unit. Each of the delay control units is configured to generate the delay control signal-used to control the first switch unit to be turned on after a predetermined delay so that the charging time is the same for all the pixel electrodes.

16 Claims, 4 Drawing Sheets

OUTPUT COMPENSATION CIRCUIT AND OUTPUT COMPENSATION METHOD FOR LCD DATA DRIVE IC, AND LCD

BACKGROUND

1. Technical Field

The present disclosure relates to the technical field of liquid crystal display, and more particularly, to an output compensation circuit and an output compensation method for a liquid crystal display (LCD) data drive integrated circuit (IC) that facilitate a narrow-frame design of an LCD, and the LCD comprising the same.

2. Description of Related Art

Figure 1:
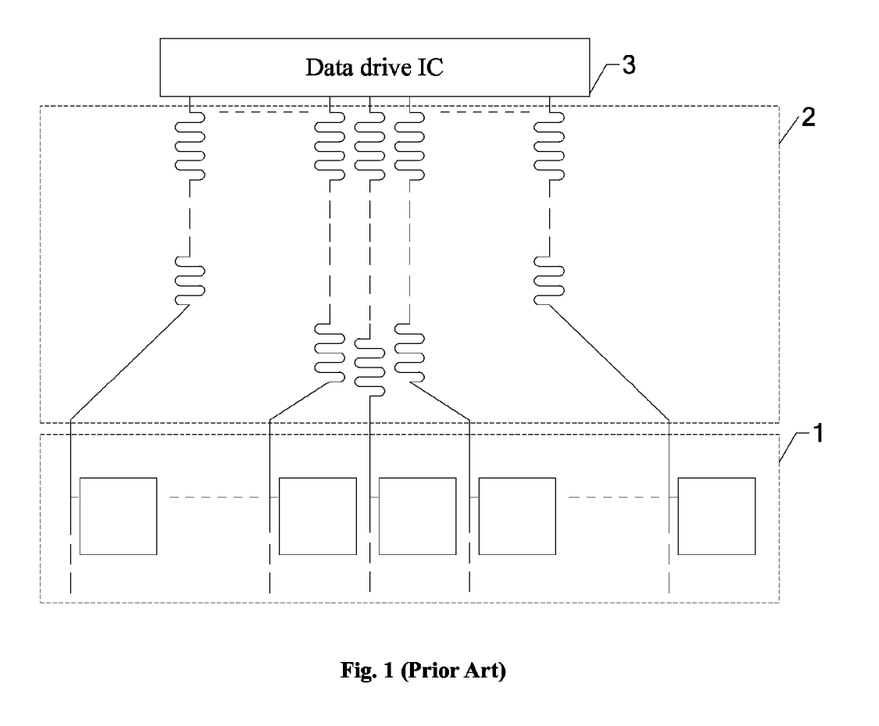
FIG. 1 is a schematic structural view illustrating a data drive IC connected to a pixel region via data lines in the prior art.

FIG. 1 shows data lines 2 in an LCD panel. In order for signals of the data lines 2 outputted by a data drive integrated circuit (IC) 3 to reach pixels of each row at the same time, impedances of the data lines 2 must be made substantially the same.

In order to make the impedances of the routing lines connected to the pixels substantially the same, a serpentine line section is usually used in the prior art. Each of the data lines 2 is connected to a pixel region 1 via a serpentine line section, and the impedances of the data lines 2 are made substantially the same through selection of the materials and lengths of the serpentine line sections. Then, when a row of pixels is opened by the corresponding scan line, all the output channels of the data drive IC 3 will output signals simultaneously; and because all the data lines in each row have substantially the same impedance, the charging time of all pixels in the same row will be the same and consequently an image displayed will present desirable uniformity. On the other hand, if the impedances of the data lines are designed to be inconsistent with each other, then the charging time of the pixels in the same row would vary from each other to cause non-uniformity of the image displayed in the region controlled by the corresponding data lines.

However, as the number of output channels of one data drive IC 3 increases, the space necessary for the serpentine line sections must be made greater in order to accomplish the output compensation. On the other hand, LCDs are now evolving towards a narrow-frame design, which tends to limit the space necessary for the serpentine line sections. Therefore, the existing wiring scheme in the form of serpentine line sections fails to satisfy the requirements of a small wiring space and uniform displaying of an image. Furthermore, the existing data drive IC 3 outputs signals from the output channels simultaneously, so a large current has to be provided to the glass substrate when all the output channels are opened, which will lead to the problem of electromagnetic interference (EMI).

BRIEF SUMMARY

The primary objective of the present disclosure is to provide an output compensation circuit and an output compensation method for an LCD data drive IC as well as an LCD comprising the same, which are intended to reduce the routing space in the glass substrate to facilitate a narrow-frame design of an LCD.

To achieve the aforesaid objective, the present disclosure provides an output compensation circuit for an LCD data drive IC, which comprises a data drive IC, a plurality of first switch units and a plurality of delay control units.

The data drive IC has a plurality of output channels, and each of the output channels is connected with a corresponding row of pixel electrodes on a glass substrate via a data line respectively to output a charging signal for charging the corresponding row of pixel electrodes.

Each of the first switch units is disposed in a corresponding one of the output channels respectively and connected with a corresponding one of the delay control units, and is configured to control the corresponding output channel according to a delay control signal generated by the corresponding delay control unit so that the charging signal is outputted after a predetermined delay.

Each of the delay control units is configured to generate the delay control signal according to an impedance value of the corresponding data line, and the delay control signal is used to control the first switch unit to be turned on after a predetermined delay so that the charging time is the same for all the pixel electrodes.

Preferably, each of the delay control units comprises a shift trigger and a second switch unit. Both the first switch units and the second switch units are metal oxide semiconductor (MOS) transistors.

The shift triggers of the delay control units are cascaded together. Each of the shift triggers has a first input terminal, a second input terminal and an output terminal. The first input terminal of the shift trigger of the first stage is connected to an external high-/low-level triggering signal input terminal to receive a high-/low-level triggering signal externally inputted, and the first input terminal of the shift trigger of each of the other stages is connected to the output terminal of the shift trigger of a previous stage respectively. The first input terminal of the shift trigger of the first stage is also connected to gates of the second switch units respectively. The second input terminals of all the shift triggers are connected to a clock controller. The output terminal of each of the shift triggers is also connected to a drain of the corresponding second switch unit and a gate of the corresponding first switch unit. A source of each of the second switch units is grounded.

A drain of each of the first switch units is connected with a corresponding one of the output channels, and a source of each of the first switch units is connected with a corresponding one of the pixel electrodes.

When the high-level triggering signal is received by the first input terminal of the shift trigger of the first stage, the shift triggers generate respective delay control signals of a predetermined delay stage by stage according to a frequency of a clock control signal generated by the clock controller so as to turn on the respective first switch units stage by stage. When the low-level triggering signal is received by the first input terminal of the shift trigger of the first stage, the shift triggers control the respective second switch units to be turned on and control the respective first switch units to be turned off respectively.

Preferably, the impedance values of the data lines decrease gradually from two sides of the data drive IC towards the middle symmetrically.

Preferably, the data drive IC has n output channels, and the number of the first switch units is n correspondingly. When n is an even number, the number of the delay control units is n/2 and the number of stages of the shift triggers cascaded together is n/2. The shift trigger of each stage is connected with one second switch unit. The output terminal of the shift trigger of the first stage is connected to gates of the $1^{st}$ first switch unit and the $n^{th}$ first switch unit respectively. The output terminal of the shift trigger of the second stage is connected to gates of the $2^{nd}$ first switch unit and the $n-1^{th}$ first switch unit respectively, and so on, where n is a natural number.

Alternatively, when n is an odd number, the number of the delay control units is (n+1)/2 and the number of stages of the shift triggers cascaded together is (n+1)/2. The shift trigger of each stage is connected with one second switch unit. The output terminal of the shift trigger of the first stage is connected to gates of the $1^{st}$ first switch unit and the $n^{th}$ first switch unit respectively. The output terminal of the shift trigger of the second stage is connected to gates of the $2^{nd}$ first switch unit and the n−$1^{th}$ first switch unit respectively, and so on, and the output terminal of the shift trigger of the (n+1)/$2^{th}$ stage is connected to a gate of the (n+1)/$2^{th}$ first switch unit, where n is a natural number.

Preferably, the data drive IC has n output channels, and the number of the first switch units is n correspondingly. The number of the delay control units is n and the number of stages of the shift triggers cascaded together is n. The shift trigger of each stage is connected with one second switch unit. The output terminal of the shift trigger of the first stage is connected to a gate of the $1^{st}$ first switch unit, the output terminal of the shift trigger of the second stage is connected to a gate of the $2^{nd}$ first switch unit, and so on, and the output terminal of the shift trigger of the $n^{th}$ stage is connected to a gate of the $n^{th}$ first switch unit.

Preferably, the high-/low-level triggering signal is the charging signal outputted by the data drive IC.

Preferably, the shift triggers cascaded together are shift registers in the data drive IC.

Preferably, the clock controller is built in the data drive IC.

The present disclosure further provides an output compensation method for an LCD data drive IC, which comprises the following steps:

generating delay control signals by delay control units under the control of a clock controller and according to impedance values of data lines between the data drive IC and corresponding rows of pixel electrodes on a glass substrate, and sending the delay control signals to first switch units in corresponding output channels of the data drive IC; and controlling, by the first switch units in the corresponding output channels of the data drive IC, the output channels in which the first switch units are located to output charging signals after predetermined delays respectively to corresponding pixel electrodes according to the delay control signals so as to make the charging time the same for all the pixel electrodes in the corresponding rows.

Preferably, the method further comprises the following steps: when a high-level triggering signal is received by the delay control units, generating respective delay control signals by the delay control units according to a frequency of a clock control signal outputted by the clock controller so as to turn on the respective first switch units stage by stage so that the charging signals are outputted after the predetermined delays to the corresponding pixel electrodes by the output channels in which the corresponding first switch units are located; and when a low-level triggering signal is received by the delay control units, controlling by the delay control units the respective first switch units to be turned off.

Preferably, the impedance values of the data lines decrease gradually from two sides of the data drive IC towards the middle symmetrically.

The present disclosure further provides a liquid crystal display (LCD), which comprises an output compensation circuit for a data drive IC. The output compensation circuit for a data drive IC comprises a data drive IC, a plurality of first switch units and a plurality of delay control units.

The data drive IC has a plurality of output channels, and each of the output channels is connected with a corresponding row of pixel electrodes on a glass substrate via a data line respectively to output a charging signal for charging the corresponding row of pixel electrodes.

Each of the first switch units is disposed in a corresponding one of the output channels respectively and connected with a corresponding one of the delay control units, and is configured to control the corresponding output channel according to a delay control signal generated by the corresponding delay control unit so that the charging signal is outputted after a predetermined delay.

Each of the delay control units is configured to generate the delay control signal according to an impedance value of the corresponding data line, and the delay control signal is used to control the first switch unit to be turned on after a predetermined delay so that the charging time is the same for all the pixel electrodes.

Preferably, each of the delay control units comprises a shift trigger and a second switch unit. Both the first switch units and the second switch units are MOS transistors.

The shift triggers of the delay control units are cascaded together. Each of the shift triggers has a first input terminal, a second input terminal and an output terminal. The first input terminal of the shift trigger of the first stage is connected to an external high-/low-level triggering signal input terminal to receive a high-/low-level triggering signal externally inputted, and the first input terminal of the shift trigger of each of the other stages is connected to the output terminal of the shift trigger of a previous stage respectively. The first input terminal of the shift trigger of the first stage is also connected to gates of the second switch units respectively. The second input terminals of all the shift triggers are connected to a clock controller. The output terminal of each of the shift triggers is also connected to a drain of the corresponding second switch unit and a gate of the corresponding first switch unit. A source of each of the second switch units is grounded.

A drain of each of the first switch units is connected with a corresponding one of the output channels, and a source of each of the first switch units is connected with a corresponding one of the pixel electrodes.

When the high-level triggering signal is received by the first input terminal of the shift trigger of the first stage, the shift triggers generate respective delay control signals of a predetermined delay stage by stage according to a frequency of a clock control signal generated by the clock controller so as to turn on the respective first switch units stage by stage. When the low-level triggering signal is received by the first input terminal of the shift trigger of the first stage, the shift triggers control the respective second switch units to be turned on and control the respective first switch units to be turned off respectively.

Preferably, the impedance values of the data lines decrease gradually from two sides of the data drive IC towards the middle symmetrically.

Preferably, the data drive IC has n output channels, and the number of the first switch units is n correspondingly. When n is an even number, the number of the delay control units is n/2 and the number of stages of the shift triggers cascaded together is n/2. The shift trigger of each stage is connected with one second switch unit. The output terminal of the shift trigger of the first stage is connected to gates of the $1^{st}$ first switch unit and the $n^{th}$ first switch unit respectively. The output terminal of the shift trigger of the second stage is connected to gates of the $2^{nd}$ first switch unit and the n−$1^{th}$ first switch unit respectively, and so on, where n is a natural number.

Alternatively, when n is an odd number, the number of the delay control units is (n+1)/2 and the number of stages of the shift triggers cascaded together is (n+1)/2. The shift trigger of each stage is connected with one second switch unit. The output terminal of the shift trigger of the first stage is connected to gates of the $1^{st}$ first switch unit and the $n^{th}$ first switch unit respectively. The output terminal of the shift trigger of the second stage is connected to gates of the $2^{nd}$ first switch unit and the n−$1^{th}$ first switch unit respectively, and so on, and the output terminal of the shift trigger of the (n+1)/$2^{th}$ stage is connected to a gate of the (n+1)/$2^{th}$ first switch unit, where n is a natural number.

Preferably, the data drive IC has n output channels, and the number of the first switch units is n correspondingly. The number of the delay control units is n and the number of stages of the shift triggers cascaded together is n. The shift trigger of each stage is connected with one second switch unit. The output terminal of the shift trigger of the first stage is connected to a gate of the $1^{st}$ first switch unit, the output terminal of the shift trigger of the second stage is connected to a gate of the $2^{nd}$ first switch unit, and so on, and the output terminal of the shift trigger of the $n^{th}$ stage is connected to a gate of the $n^{th}$ first switch unit.

Preferably, the high-/low-level triggering signal is the charging signal outputted by the data drive IC.

Preferably, the shift triggers cascaded together are shift registers in the data drive IC.

Preferably, the clock controller is built in the data drive IC.

According to the output compensation circuit and the output compensation method for an LCD data drive IC as well as the LCD comprising the same of the present disclosure, unmatching impedance between data lines from the data drive IC to individual rows of pixel electrodes is compensated by using delay control units to delay charging signals, which are outputted by the data drive IC, sequentially from two sides to the middle. In this way, the charging time in a row of pixel electrodes is substantially the same for each output channel, so uniformity of the image displayed by the LCD is ensured. Meanwhile, because the need of serpentine line sections is eliminated for the data lines, the routing space necessary in the glass substrate becomes smaller, which is favorable for the narrow-frame design of the LCD and allows for use of a larger number of output channels in the chip on film (COF). This reduces the cost and also improves the EMI problem arising when all output channels are opened simultaneously.

To make the technical solutions of the present disclosure more apparent and clearer, embodiments of the present disclosure will be further described with reference to the attached drawings.

DETAILED DESCRIPTION

It shall be understood that, the embodiments described herein are only intended to illustrate but not to limit the present disclosure.

The primary solution of the present disclosure is as follows: output control switches are disposed in output channels of a data drive IC, and are turned on stage by stage by delay control units according to impedance values of data lines so that the charging time is the same for pixel electrodes in each row on a glass substrate, which ensures uniformity of the image displayed; and because the need of serpentine line sections is eliminated for the data lines, the wiring space is reduced, which is favorable for the narrow-frame design of the LCD.

Figure 2:
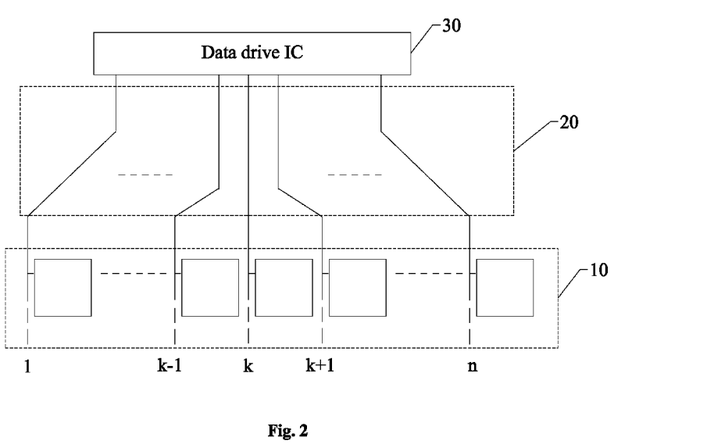
FIG. 2 is a schematic structural view illustrating a data drive IC connected to a pixel region via data lines in an embodiment of an output compensation circuit for an LCD data drive IC according to the present disclosure.
Figure 3:
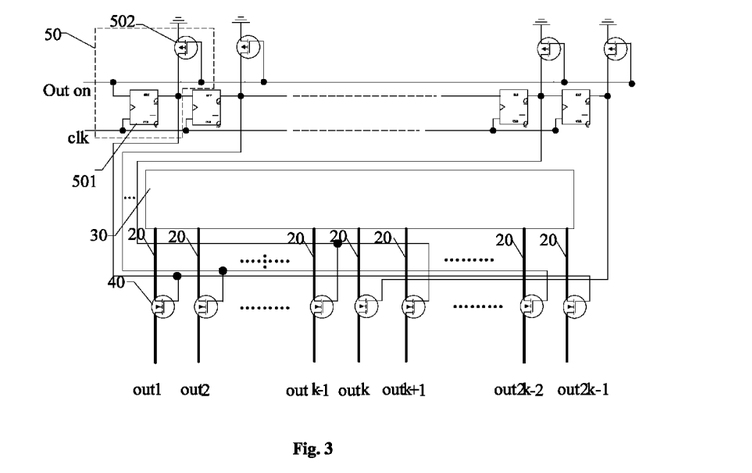
FIG. 3 is a schematic structural view illustrating the embodiment of the output compensation circuit for an LCD data drive IC according to the present disclosure.

Referring to FIG. 2 and FIG. 3 together, FIG. 2 is a schematic structural view illustrating data lines outputted from a data drive IC that charge pixel electrodes without the need of wiring according to the present disclosure; and FIG. 3 is a schematic structural view illustrating an output compensation circuit for a data drive IC according to the present disclosure.

In FIG. 2, the data drive IC 30 is connected to a pixel region 10 via a plurality of data lines (the number of the data lines is represented by n in FIG. 2, where n is a natural number) 20 to charge pixel electrodes in the pixel region 10.

When the data lines 20 are outputted from the data drive IC 30, the routing scheme is not in the form of serpentine line sections as shown in FIG. 1 but is in the form of straight line sections, which saves the space required by wiring so that the frame of the LCD panel can be made narrower. However, when being connected in the form of straight line sections, the data lines 20 outputted from the data drive IC 30 have different lengths from each other and thus have different impedance values. If all output channels of the data drive IC 30 output data signals simultaneously, then the time for the data signals to charge corresponding pixels via the data lines 20 may be different and the charging time for the data line 20 having a large impedance value is relatively short, which leads to nonuniformity of the image displayed of the pixel region 10 controlled by the data drive IC 30. Accordingly, the present disclosure adopts delay control units 50 to control the output time of each of the output channels so that the output time of each of the output channels matches with the impedance value of the corresponding data line 20. This ensures that the charging time in a row of pixel electrodes in the pixel region 10 is the same for each output channel, so the image displayed uniformly is achieved.

Specifically, as shown in FIG. 3, the output compensation circuit for an LCD data drive IC comprises a data drive IC 30, a plurality of first switch units 40 and a plurality of delay control units 50.

The data drive IC 30 has a plurality of output channels, and each of the output channels is connected with a corresponding row of pixel electrodes on a glass substrate via a data line 20 respectively to output a charging signal for charging the corresponding row of pixel electrodes.

Each of the first switch units 40 is disposed in a corresponding one of the output channels respectively and connected with a corresponding one of the delay control units 50, and is configured to control the corresponding output channel according to a delay control signal generated by the corresponding delay control unit 50 so that the charging signal is outputted after a predetermined delay.

Each of the delay control units 50 is configured to generate the delay control signal according to an impedance value of the corresponding data line 20, and the delay control signal is used to control the first switch unit 40 to be turned on after a predetermined delay so that the charging time is the same for all the pixel electrodes.

Each of the delay control units 50 comprises a shift trigger 501 and a second switch unit 502. Both the first switch units 40 and the second switch units 502 are metal oxide semiconductor (MOS) transistors. Specifically, the first switch units 40 are N-channel metal oxide semiconductor (NMOS) transistors, and the second switch units 502 are P-channel metal oxide semiconductor (PMOS) transistors. In this embodiment, the shift triggers 501 of the delay control units 50 are cascaded together. Each of the shift triggers 501 has a first input terminal, a second input terminal and an output terminal. The first input terminal of the shift trigger 501 of the first stage is connected to an external high-/low-level triggering signal input terminal to receive a high-/low-level triggering signal externally inputted, and the first input terminal of the shift trigger 501 of each of the other stages is connected to the output terminal of the shift trigger 501 of a previous stage respectively.

The second input terminals of all the shift triggers 501 are connected to a clock controller. The output terminal of each of the shift triggers 501 is also connected to a drain of the corresponding second switch unit 502 and a gate of the corresponding first switch unit 40. A source of each of the second switch units 502 is grounded.

Furthermore, the first input terminal of the shift trigger 501 of the first stage is also connected to gates of the second switch units 502 respectively.

A drain of each of the first switch units 40 is connected with a corresponding one of the output channels, and a source of each of the first switch units 40 is connected with a corresponding one of the pixel electrodes.

When the high-level triggering signal is received by the first input terminal of the shift trigger 501 of the first stage, the shift triggers 501 generate respective delay control signals of a predetermined delay stage by stage according to a frequency of a clock control signal generated by the clock controller so as to turn on the respective first switch units 40 stage by stage. When the low-level triggering signal is received by the first input terminal of the shift trigger 501 of the first stage, the shift triggers 501 control the respective second switch units 502 to be turned on and control the respective first switch units 40 to be turned off respectively.

This embodiment will be illustrated by taking the impedance values of the data lines 20 decreasing gradually from two sides of the data drive IC 30 towards the middle symmetrically as an example. The data line 20 having the minimum impedance is unnecessarily located in the output channel in the middle of the COF; and the impedances of the data lines 20 unnecessarily increase symmetrically from the middle channel to the two sides. Therefore, the optimal effect can only be achieved by adjusting delays depending on the actual impedance distribution.

In this embodiment, it is defined that the data drive IC 30 has odd output channels, and this will be taken as an example for illustration. That is, it is defined that the number n of the output channels of the data drive IC 30 is an odd number with n=2k−1, where k is a natural number. 2k−1 output channels correspond to 2k−1 data lines 20, and the number of the first switch units 40 is 2k−1 correspondingly. Meanwhile, it is defined that the number of the delay control units 50 is k and the number of stages of the shift triggers 501 cascaded together is k. The shift trigger 501 of each stage is connected with one second switch unit 502. The output terminal of the shift trigger 501 of the first stage is connected to gates of the $1^{st}$ first switch unit 40 and the $2k-1^{th}$ first switch unit 40 respectively. The output terminal of the shift trigger 501 of the second stage is connected to gates of the $2^{nd}$ first switch unit 40 and the $2k-2^{th}$ first switch unit 40 respectively, and so on, and the output terminal of the shift trigger 501 of the $k^{th}$ stage is connected to a gate of the $k^{th}$ first switch unit 40.

The routing scheme of the data lines 20 is shown in FIG. 2. The impedance values of the data lines 20 decrease gradually from two sides towards the middle symmetrically.

The $k^{th}$ data line 20 is outputted from the $k^{th}$ channel of the data drive IC 30, and has the shortest path between the data drive IC 30 and the pixel region 10 and thus has the minimum impedance. The impedances of the channels on the left and the right of the $k^{th}$ channel gradually increase symmetrically. The impedance values decrease gradually from the $1^{st}$ data line 20 to the $k^{th}$ data line 20, and then increase gradually from the $k+1^{th}$ data line 20 to the $2k-1^{th}$ data line 20. The $1^{st}$ data line 20 has the same impedance value as the $2k-1^{th}$ data line 20, the $2^{nd}$ data line 20 has the same impedance value as the $2k-2^{th}$ data line 20, and so on, the $k-1^{th}$ data line 20 has the same impedance value as the $k+1^{th}$ data line 20, and the $k^{th}$ data line 20 has the minimum impedance value. Thus, when the delay control units 50 do not operate, the charging time for pixel electrodes in each row will decrease gradually from the $k^{th}$ output channel towards two sides if all the output channels of the data drive IC 30 output signals simultaneously. In this way, when the same gray scale is displayed in the middle, colors displayed will be different.

Under the control of the delay control units 50, the time for each of the output channels of the data drive IC 30 to output a charging signal is adjusted so that the charging time is the same for the pixel electrodes in each row in the pixel region 10. Specifically, this is accomplished in the following way.

The 2k−1 first switch units 40 control switches of the output channels in which the 2k−1 data lines 20 are located in one-to-one correspondence. Specifically, the $1^{st}$ first switch unit 40 is located in the $1^{st}$ output channel of the data drive IC 30 to control the switch of the $1^{st}$ data line 20, the $2^{nd}$ first switch unit 40 is located in the $2^{nd}$ output channel of the data drive IC 30 to control the switch of the $2^{nd}$ data line 20, and so on, the $k^{th}$ first switch unit 40 is located in the $k^{th}$ output channel of the data drive IC 30 to control the switch of the $k^{th}$ data line 20, and the $2k-1^{th}$ first switch unit 40 is located in the $2k-1^{th}$ output channel of the data drive IC 30 to control the switch of the $2k-1^{th}$ data line 20.

In this embodiment, the shift triggers 501 may be rising edge D triggers.

The shift triggers 501 cascaded together are rising edge D triggers 501 of k stages connected in series. The output terminal of the rising edge D trigger 501 of each stage is connected to a gate of the corresponding first switch unit 40 to control the corresponding first switch unit 40 to be turned on or off.

Specifically, the output terminal of the rising edge D trigger 501 of the first stage is connected to gates of the first switch units 40 of the $1^{st}$ data line 20 and the $2k-1^{th}$ data line 20, the output terminal of the rising edge D trigger 501 of the second stage is connected to gates of the first switch units 40 of the $2^{nd}$ data line 20 and the $2k-2^{th}$ data line 20, and so on, the output terminal of the rising edge D trigger 501 of the $k-1^{th}$ stage is connected to gates of the first switch units 40 of the $k-1^{th}$ data line 20 and the $k+1^{th}$ data line 20, and the output terminal of the rising edge D trigger 501 of the $k^{th}$ stage is connected to a gate of the first switch unit 40 of the $k^{th}$ dataline 20.

Gates of the second switch units 502 are connected to the input terminal of the rising edge D trigger 501 of the first stage respectively to simultaneously receive a high-/low-level triggering signal externally inputted.

Drains of the second switch units 502 are connected to gates of the first switch units 40 in one-to-one correspondence. That is, a drain of the $1^{st}$ second switch unit 502 is connected to a gate of the $1^{st}$ first switch unit 40, a drain of the $2^{nd}$ second switch unit 502 is connected to a gate of the $2^{nd}$ first switch unit 40, and so on, a drain of the $k^{th}$ second switch unit 502 is connected to a gate of the $k^{th}$ first switch unit 40, and a drain of the $2k-1^{th}$ second switch unit 502 is connected to a gate of the $2k-1^{th}$ first switch unit 40. A source of each of the second switch units 502 is grounded.

Figure 4:
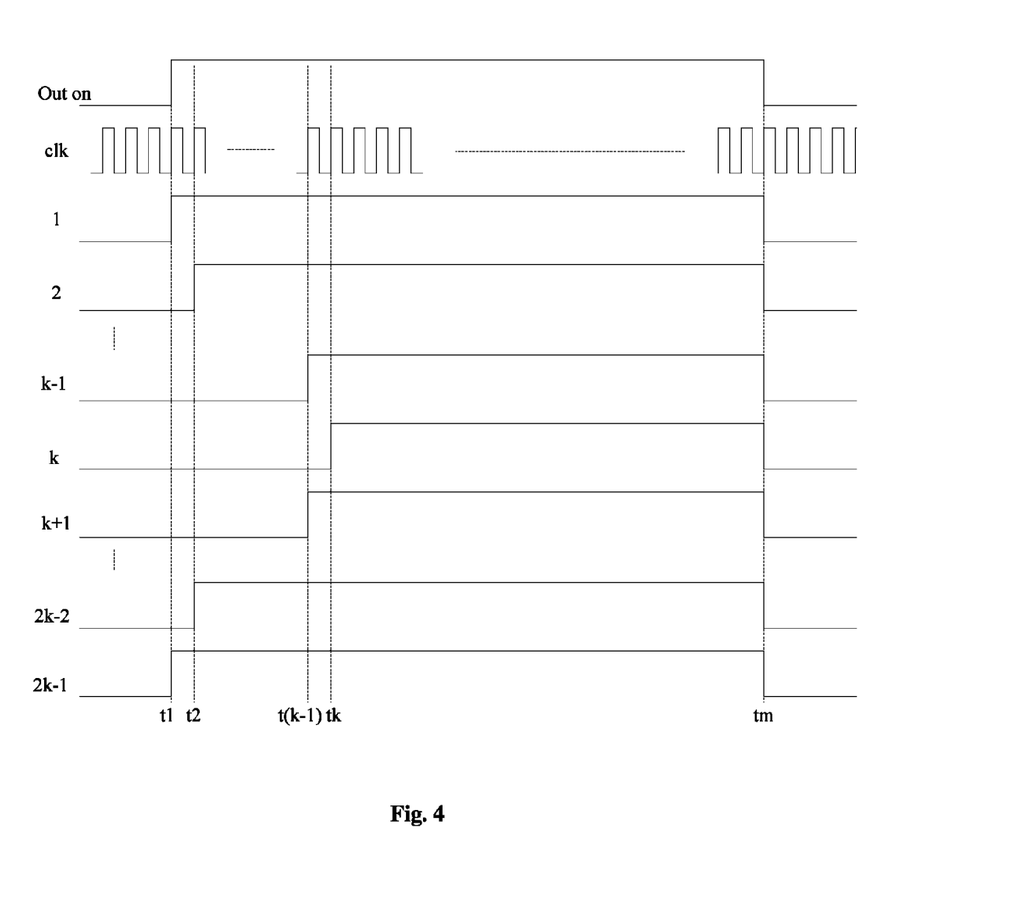
FIG. 4 is a schematic view illustrating the operation timing sequence of output channels in the embodiment of the output compensation circuit for an LCD data drive IC according to the present disclosure.

FIG. 4 is a schematic view illustrating the operation timing sequence of the output channels of the data drive IC 30. When a rising edge of a clock pulse signal 'clk' at the second input terminal (i.e., the clock control signal input terminal) of each of the rising edge D triggers 501 cascaded together appears, the corresponding rising edge D trigger 501 turns into a status which is determined by the level of the Out on signal received by the second input terminal. Before the time point t1, the Out on signal is at a low level, the output terminal of each of the rising edge D triggers 501 is at a low level, and all the first switch units 40 are in an off status. At the time point t1, the Out on signal rises to a high level from the low level. At this time, the rising edge of the clock pulse signal at the second input terminal of the rising edge D trigger 501 of the first stage appears. The rising edge D trigger 501 of the first stage turns, and the output terminal thereof turns to a high level and provides the high level to the second input terminal of the rising edge D trigger 501 of the second stage. At this time, gates of the $1^{st}$ first switch unit 40 and the $2k-1^{th}$ first switch unit 40 receive the high level and control the $1^{st}$ data line and the $2k-1^{th}$ data line to be turned on to charge the corresponding pixels. At the time point t2, the second input terminal of the rising edge D trigger 501 of the second stage rises to a high level; and when a next rising edge of the clock pulse signal appears, the output terminal of the rising edge D trigger 501 of the second stage turns to a high level. At this time, gates of the $2^{nd}$ first switch unit 40 and the $2k-2^{th}$ first switch unit 40 receive the high level and control the $2^{nd}$ data line and the $2k-2^{th}$ data line to be turned on to charge the corresponding pixels, and so on. At the time point tk, the output terminal of the rising edge D trigger 501 of the $k^{th}$ stage outputs a high level, and a gate of the $k^{th}$ first switch unit 40 receives the high level and controls the $k^{th}$ data line to be turned on. Thus, the delay control units 50 control the output channel of each of the data lines 20 to be opened at an appropriate time so that the data lines 20 are turned on one by one from two sides towards the middle. In this way, the difference between the impedance values gets compensated, which ensures that the charging time is the same for all the pixel electrodes.

At the time point tm, the second input terminal of each of the rising edge D triggers 501 cascaded together falls to a low level from the high level. At this time, all the output channels in which the data lines 20 are located are closed instantaneously under the drop-down action of the second switch units 502.

In this embodiment, the data drive IC 30 and the delay control units 50 may be press fitted on the glass substrate through the COF or the chip on glass (COG).

In the case that the number of the output channels of the data drive IC 30 is an even number (i.e., n=2k, where k is a natural number), the basic principle of the output compensation for the data drive IC 30 is the same as that in the aforesaid embodiment except that the number of the output channels is different. The impedance values of the data lines 20 also decrease gradually from two sides towards the middle. The delay control units 50 generate respective delay control signals under the control of a clock controller and according to the impedance values of the data lines 20 to sequentially delay the charging signals outputted by the data drive IC 30 from two sides to the middle. In this way, unmatching impedance between the data lines 20 from the data drive IC 30 to individual rows of pixel electrodes is compensated so that the charging time in a row of pixel electrodes is substantially the same for each output channel. In other embodiments, depending on different routing designs of the LCD panels, the impedance values of the data lines 20 unnecessarily decrease gradually from two sides towards the middle, increasing of the impedances from the middle to two sides is unnecessarily symmetrical, and a difference may also exist between delays of waveforms. In this case, the delays of the outputted waveforms must be adjusted depending on the actual impedance distribution. For example, the rising edge D trigger 501 of each stage may comprise one or more rising edge D triggers 501 connected in series; and in this way, appropriate compensation can be achieved so that the charging time is the same for all the pixel electrodes.

The rising edge D triggers 501 cascaded together may also be shift registers shared in the data drive IC 30, and the clock controller may also be built in the data drive IC 30. The second input terminal (i.e., the clock control signal receiving terminal) of each of the shift registers may also be connected to a time-control (T-CON) output terminal via a T-CON in the data drive IC 30. In this case, because a clock signal provided by the T-CON has a high frequency, an appropriate Δt may also be obtained by controlling the frequency of the clock signal 'clk' of each of the rising edge D triggers 501 cascaded together; and this can ensure that the charging time is the same for all the pixel electrodes so as to achieve the optimal actual image. Meanwhile, the delay duration of each of the output channels may also be controlled by controlling the frequency of the signal 'clk' or through separation of more D triggers.

Furthermore, the high-/low-level triggering signal received by the first input terminal of each of the rising edge D triggers 501 cascaded together may also the charging signal outputted by the data drive IC.

According to this embodiment, the time for each output channel to output a charging signal is adjusted so that the output time of each output channel matches with the impedance value of the corresponding data line; and this ensures that the charging time in a row of pixel electrodes is the same for each output channel, so the image displayed uniformly is achieved. In this way, the output compensation is achieved without the need of serpentine line sections, which increases the utilization ratio of the glass substrate and allows for a narrower frame of the glass. The data drive IC 30 can use a larger number of output channels, which reduces the cost. Moreover, this also improves the EMI problem arising when all the channels are opened simultaneously.

On the basis of the principle of the aforesaid preferred embodiment, the delay control units 50 may also be defined to be in one-to-one correspondence with the output channels of the data drive IC 30; that is, when the data drive IC 30 has n channels, the number of the delay control units 50 is n. The number of stages of the shift triggers 501 cascaded together is n. The output terminal of the shift trigger 501 of the first stage is connected to a gate of the $1^{st}$ first switch unit 40, the output terminal of the shift trigger 501 of the second stage is connected to a gate of the $2^{nd}$ first switch unit 40, and so on, and the output terminal of the shift trigger 501 of the $n^{th}$ stage is connected to a gate of the $n^{th}$ first switch unit 40. Other operation manners and principles are the same as those in the aforesaid preferred embodiment.

Figure 5:
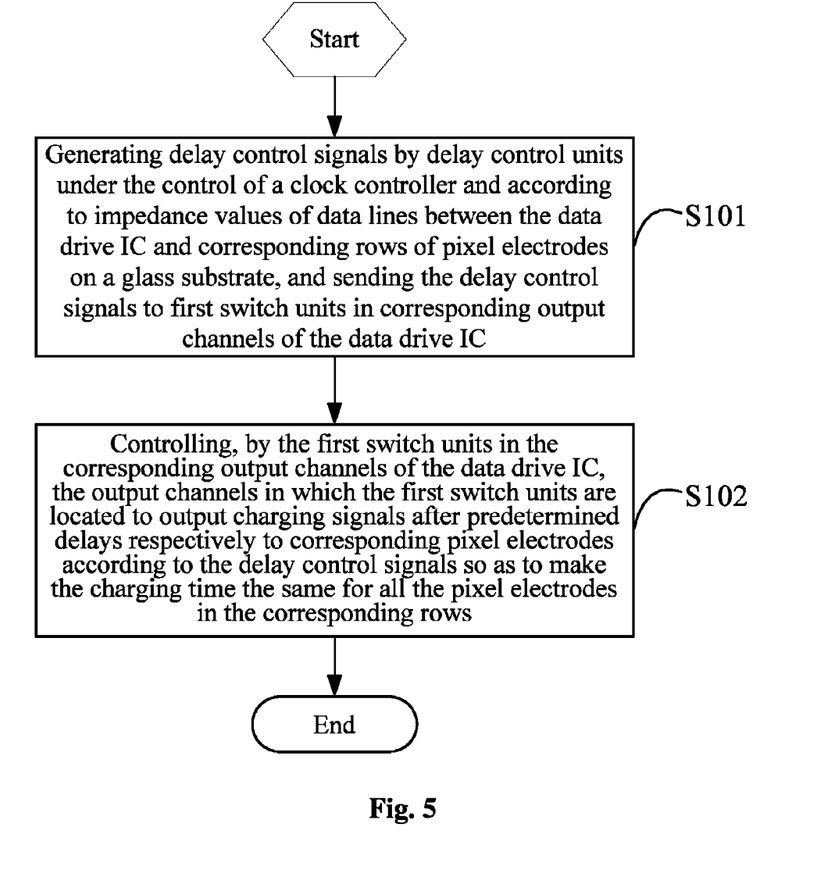
FIG. 5 is a schematic flowchart diagram of an embodiment of an output compensation method for an LCD data drive IC according to the present disclosure.

As shown in FIG. 5, the present disclosure further provides an output compensation method for an LCD data drive IC, which comprises the following steps:

step S101: generating delay control signals by delay control units under the control of a clock controller and according to impedance values of data lines between the data drive IC and corresponding rows of pixel electrodes on a glass substrate, and sending the delay control signals to first switch units in corresponding output channels of the data drive IC; and step S102: controlling, by the first switch units in the corresponding output channels of the data drive IC, the output channels in which the first switch units are located to output charging signals after predetermined delays respectively to corresponding pixel electrodes according to the delay control signals so as to make the charging time the same for all the pixel electrodes in the corresponding rows.

In the output compensation method for an LCD data drive IC according to the present disclosure, when a high-level triggering signal is received by the delay control units, the delay control units generate respective delay control signals according to a frequency of a clock control signal outputted by the clock controller so as to turn on the respective first switch units stage by stage so that the charging signals are outputted after the predetermined delays to the corresponding pixel electrodes by the output channels in which the corresponding first switch units are located; and when a low-level triggering signal is received by the delay control units, the delay control units control the respective first switch units to be turned off.

In the output compensation method for an LCD data drive IC according to the present disclosure, the impedance values of the data lines decrease gradually from two sides of the data drive IC towards the middle symmetrically. However, depending on different routing designs of the LCD panels, the impedance values of the data lines unnecessarily decrease gradually from two sides towards the middle, increasing of the impedances from the middle to two sides is unnecessarily symmetrical, and a difference may also exist between delays of waveforms. In this case, the delays of the outputted waveforms must be adjusted depending on the actual impedance distribution in order to achieve the optimal effect. The basic principle of the output compensation for a data drive IC can be understood with reference to the aforesaid description of the output compensation circuit, and thus will not be further described herein.

Furthermore, the present disclosure further provides a liquid crystal display (LCD) that comprises the output compensation circuit for an LCD data drive IC described in the aforesaid embodiment, which will not be further described herein.

According to the output compensation circuit and the output compensation method for an LCD data drive IC as well as the LCD comprising the same of the present disclosure, unmatching impedance between data lines from the data drive IC to individual rows of pixel electrodes is compensated by using delay control units to delay charging signals, which are outputted by the data drive IC, sequentially from two sides to the middle. In this way, the charging time in a row of pixel electrodes is substantially the same for each output channel, so uniformity of the image displayed by the LCD is ensured. Meanwhile, because the need of serpentine line sections is eliminated for the data lines, the routing space necessary in the glass substrate becomes smaller, which is favorable for the narrow-frame design of the LCD and allows for use of a larger number of output channels in the COF. This reduces the cost and also improves the EMI problem arising when all output channels are opened simultaneously.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. An output compensation circuit for a liquid crystal display (LCD) data drive integrated circuit (IC), comprising a data drive IC, a plurality of first switch units and a plurality of delay control units, wherein:

the data drive IC has a plurality of output channels, and each of the output channels is connected with a corresponding row of pixel electrodes on a glass substrate via a data line respectively to output a charging signal for charging the corresponding row of pixel electrodes;

each of the first switch units is disposed in a corresponding one of the output channels respectively and connected with a corresponding one of the delay control units, and is configured to control the corresponding output channel according to a delay control signal generated by the corresponding delay control unit so that the charging signal is outputted after a predetermined delay; and each of the delay control units is configured to generate the delay control signal according to an impedance value of the corresponding data line, and the delay control signal is used to control the first switch unit to be turned on after a predetermined delay so that the charging time is the same for all the pixel electrodes;

wherein each of the delay control units comprises a shift trigger and a second switch unit, and both the first switch units and the second switch units are metal oxide semiconductor (MOS) transistors, wherein:

the shift triggers of the delay control units are cascaded together; each of the shift triggers has a first input terminal, a second input terminal and an output terminal, the first input terminal of the shift trigger of the first stage is connected with an external on/off signal input terminal to receive a on/off signal externally inputted, and the first input terminal of the shift trigger of each of the other stages is connected with the output terminal of the shift trigger of a previous stage respectively; the first input terminal of the shift trigger of the first stage is also connected with gates of the second switch units respectively; the second input terminals of all the shift triggers are connected with a clock controller, and the output terminal of each of the shift triggers is also connected with a drain of the corresponding second switch unit and a gate of the corresponding first switch unit; and a source of each of the second switch units is grounded;

a drain of each of the first switch units is connected with a corresponding one of the output channels, and a source of each of the first switch units is connected with a corresponding one of the pixel electrodes; and when the on signal is received by the first input terminal of the shift trigger of the first stage, the shift triggers generate respective delay control signals of a predetermined delay stage by stage according to a frequency of a clock control signal generated by the clock controller so as to turn on the respective first switch units stage by stage; and when the off signal is received by the first input terminal of the shift trigger of the first stage, the shift triggers control the respective second switch units to be turned on and control the respective first switch units to be turned off respectively.

2. The output compensation circuit for an LCD data drive IC of claim 1, wherein the impedance values of the data lines decrease gradually from two sides of the data drive IC towards the middle symmetrically.

3. The output compensation circuit for an LCD data drive IC of claim 2, wherein the data drive IC has n output channels, and the number of the first switch units is n correspondingly; when n is an even number, the number of the delay control units is n/2 and the number of stages of the shift triggers cascaded together is n/2; the shift trigger of each stage is connected with one second switch unit, and the output terminal of the shift trigger of the first stage is connected with gates of the 1st first switch unit and the nth first switch unit respectively; and the output terminal of the shift trigger of the second stage is connected with gates of the 2nd first switch unit and the n−1th first switch unit respectively, and so on, where n is a natural number; or when n is an odd number, the number of the delay control units is (n+1)/2 and the number of stages of the shift triggers cascaded together is (n+1)/2; the shift trigger of each stage is connected with one second switch unit, and the output terminal of the shift trigger of the first stage is connected with gates of the 1st first switch unit and the nth first switch unit respectively; and the output terminal of the shift trigger of the second stage is connected with gates of the 2nd first switch unit and the n−1th first switch unit respectively, and so on, and the output terminal of the shift trigger of the (n+1)/2th stage is connected with a gate of the (n+1)/2th first switch unit, where n is a natural number.

4. The output compensation circuit for an LCD data drive IC of claim 2, wherein the data drive IC has n output channels, and the number of the first switch units is n correspondingly; and the number of the delay control units is n and the number of stages of the shift triggers cascaded together is n, the shift trigger of each stage is connected with one second switch unit, the output terminal of the shift trigger of the first stage is connected with a gate of the 1st first switch unit, the output terminal of the shift trigger of the second stage is connected with a gate of the 2nd first switch unit, and so on, and the output terminal of the shift trigger of the nth stage is connected with a gate of the nth first switch unit.

5. The output compensation circuit for an LCD data drive IC of claim 1, wherein the on/off signal is the charging signal outputted by the data drive IC.

6. The output compensation circuit for an LCD data drive IC of claim 1, wherein the shift triggers cascaded together are shift registers in the data drive IC.

7. The output compensation circuit for an LCD data drive IC of claim 5, wherein the clock controller is built in the data drive IC.

8. An output compensation method for an LCD data drive integrated circuit (IC), comprising the following steps:
generating delay control signals by delay control units under the control of a clock controller and according to impedance values of data lines between the data drive IC and corresponding rows of pixel electrodes on a glass substrate, and sending the delay control signals to first switch units in corresponding output channels of the data drive IC; and
controlling, by the first switch units in the corresponding output channels of the data drive IC, the output channels in which the first switch units are located to output charging signals after predetermined delays respectively to corresponding pixel electrodes according to the delay control signals so as to make the charging time the same for all the pixel electrodes in the corresponding rows;
wherein each of the delay control units comprises a shift trigger and a second switch unit, and both the first switch units and the second switch units are metal oxide semiconductor (MOS) transistors, wherein:

the shift triggers of the delay control units are cascaded together; each of the shift triggers has a first input terminal, a second input terminal and an output terminal, the first input terminal of the shift trigger of the first stage is connected with an external on/off signal input terminal to receive a on/off signal externally inputted, and the first input terminal of the shift trigger of each of the other stages is connected with the output terminal of the shift trigger of a previous stage respectively; the first input terminal of the shift trigger of the first stage is also connected with gates of the second switch units respectively; the second input terminals of all the shift triggers are connected with a clock controller, and the output terminal of each of the shift triggers is also connected with a drain of the corresponding second switch unit and a gate of the corresponding first switch unit; and a source of each of the second switch units is grounded;

a drain of each of the first switch units is connected with a corresponding one of the output channels, and a source of each of the first switch units is connected with a corresponding one of the pixel electrodes; and when the on signal is received by the first input terminal of the shift trigger of the first stage, the shift triggers generate respective delay control signals of a predetermined delay stage by stage according to a frequency of a clock control signal generated by the clock controller so as to turn on the respective first switch units stage by stage; and when the off signal is received by the first input terminal of the shift trigger of the first stage, the shift triggers control the respective second switch units to be turned on and control the respective first switch units to be turned off respectively.

9. The output compensation method for an LCD data drive IC of claim 8, wherein the impedance values of the data lines decrease gradually from two sides of the data drive IC towards the middle symmetrically.

10. A liquid crystal display (LCD), comprising an output compensation circuit for a data drive integrated circuit (IC), wherein the output compensation circuit for a data drive IC comprises a data drive IC, a plurality of first switch units and a plurality of delay control units, wherein:
the data drive IC has a plurality of output channels, and each of the output channels is connected with a corresponding row of pixel electrodes on a glass substrate via a data line respectively to output a charging signal for charging the corresponding row of pixel electrodes;
each of the first switch units is disposed in a corresponding one of the output channels respectively and connected with a corresponding one of the delay control units, and is configured to control the corresponding output channel according to a delay control signal generated by the corresponding delay control unit so that the charging signal is outputted after a predetermined delay; and
each of the delay control units is configured to generate the delay control signal according to an impedance value of the corresponding data line, and the delay control signal is used to control the first switch unit to be turned on after a predetermined delay so that the charging time is the same for all the pixel electrodes;
wherein each of the delay control units comprises a shift trigger and a second switch unit, and both the first switch units and the second switch units are MOS transistors, wherein:
the shift triggers of the delay control units are cascaded together; each of the shift triggers has a first input terminal, a second input terminal and an output terminal, the first input terminal of the shift trigger of the first stage is connected with an external on/off signal input terminal to receive a on/off signal externally inputted, and the first input terminal of the shift trigger of each of the other stages is connected with the output terminal of the shift trigger of a previous stage respectively; the first input terminal of the shift trigger of the first stage is also connected with gates of the second switch units respectively; the second input terminals of all the shift triggers are connected with a clock controller, and the output terminal of each of the shift triggers is also connected with a drain of the corresponding second switch unit and a gate of the corresponding first switch unit; and a source of each of the second switch units is grounded;

a drain of each of the first switch units is connected with a corresponding one of the output channels, and a source of each of the first switch units is connected with a corresponding one of the pixel electrodes; and when the on signal is received by the first input terminal of the shift trigger of the first stage, the shift triggers generate respective delay control signals of a predetermined delay stage by stage according to a frequency of a clock control signal generated by the clock controller so as to turn on the respective first switch units stage by stage; and when the off signal is received by the first input terminal of the shift trigger of the first stage, the shift triggers control the respective second switch units to be turned on and control the respective first switch units to be turned off respectively.

11. The LCD of claim 10, wherein the impedance values of the data lines decrease gradually from two sides of the data drive IC towards the middle symmetrically.

12. The LCD of claim 11, wherein the data drive IC has n output channels, and the number of the first switch units is n correspondingly; when n is an even number, the number of the delay control units is n/2 and the number of stages of the shift triggers cascaded together is n/2; the shift trigger of each stage is connected with one second switch unit, and the output terminal of the shift trigger of the first stage is connected with gates of the 1st first switch unit and the nth first switch unit respectively; and the output terminal of the shift trigger of the second stage is connected with gates of the 2nd first switch unit and the n−1th first switch unit respectively, and so on, where n is a natural number; or when n is an odd number, the number of the delay control units is (n+1)/2 and the number of stages of the shift triggers cascaded together is (n+1)/2; the shift trigger of each stage is connected with one second switch unit, and the output terminal of the shift trigger of the first stage is connected with gates of the 1st first switch unit and the nth first switch unit respectively; and the output terminal of the shift trigger of the second stage is connected with gates of the 2nd first switch unit and the n−1th first switch unit respectively, and so on, and the output terminal of the shift trigger of the (n+1)/2th stage is connected with a gate of the (n+1)/2th first switch unit, where n is a natural number.

13. The LCD of claim 11, wherein the data drive IC has n output channels, and the number of the first switch units is n correspondingly; and the number of the delay control units is n and the number of stages of the shift triggers cascaded together is n, the shift trigger of each stage is connected with one second switch unit, the output terminal of the shift trigger of the first stage is connected with a gate of the 1st first switch unit, the output terminal of the shift trigger of the second stage is connected with a gate of the 2nd first switch unit, and so on, and the output terminal of the shift trigger of the nth stage is connected with a gate of the nth first switch unit.

14. The LCD of claim 10, wherein the on/off signal is the charging signal outputted by the data drive IC.

15. The LCD of claim 10, wherein the shift triggers cascaded together are shift registers in the data drive IC.

16. The LCD of claim 15, wherein the clock controller is built in the data drive IC.

* * * * *